United States Patent [19]
Blauert et al.

[11] Patent Number: 5,507,055
[45] Date of Patent: Apr. 16, 1996

[54] METHOD FOR DETERMINING THE AMOUNT OF LANUDRY IN A LAUNDRY HANDLING MACHINE

[75] Inventors: Peter Blauert; Frank Böldt; Martina Wöbkemeier, all of Berlin; Paul T. Pilgram; Ulrich Rehfuess, both of München, all of Germany

[73] Assignee: Bosch-Siemens Hausgeraete GmbH, Munich, Germany

[21] Appl. No.: 328,468

[22] Filed: Oct. 26, 1994

[30] Foreign Application Priority Data

Oct. 25, 1993 [DE] Germany .......................... 43 36 350.4

[51] Int. Cl.$^6$ .................................................. D06F 33/02
[52] U.S. Cl. ............................ 8/159; 68/12.04; 68/12.12
[58] Field of Search ........................... 8/159; 68/12.01, 68/12.02, 12.04, 12.12, 24

[56] References Cited

U.S. PATENT DOCUMENTS 4,607,408  8/1986  Didier et al. ...................... 68/12.04 X
5,335,524  8/1994  Sakane ............................... 68/12.04

FOREIGN PATENT DOCUMENTS 2921911  12/1980  Germany.
3030491   2/1982  Germany.
3329345   2/1985  Germany.
3446288   6/1986  Germany.

*Primary Examiner*—Philip R. Coe
*Attorney, Agent, or Firm*—Herbert L. Lerner; Laurence A. Greenberg

[57] ABSTRACT

A method for determining an amount of laundry in an at least approximately horizontally supported drum for laundry being driven by a universal drive motor at a washing and drying rpm is performed on the basis of observations of parameters of an operation in a laundry handling machine. A drive moment at the drum drive motor is determined during a drum startup phase, for operating the drum at a controlled handling rpm at which the laundry is not held against a wall of the drum by centrifugal force.

9 Claims, 2 Drawing Sheets

METHOD FOR DETERMINING THE AMOUNT OF LANUDRY IN A LAUNDRY HANDLING MACHINE

BACKGROUND OF THE INVENTION

1. Field of the Invention

The invention relates to a method for determining the amount of laundry in an at least approximately horizontally supported drum for laundry being drivable by a universal motor at a washing and drying rpm, on the basis of observations of parameters of an operation in a laundry handling machine.

Such methods are known from German Published, Non-Prosecuted Applications DE 30 30 491 and 33 29 345. In those methods, in order to determine the amount of laundry, or the amount of water needed to wash that amount of laundry, the inflow time between two certain level marks in the wash water holder are measured and a conclusion is drawn therefrom as to the final amount of water required. That method is very inaccurate, because both the water pressure prevailing upstream of the magnet valve and the quantity controller located in the magnet valve as well as the water level transducer or transducers, each involve tolerances, which can even add up in the least favorable case. That kind of quantity determination can also be carried out only once in the entire process of laundry handling, namely during the first time that water flows in and during the thus-effected wetting of the laundry.

In order to eliminate those inaccuracies, it has already been proposed to determine the inflowing amount of water by means of a water meter (German Published, Non-Prosecuted Application DE 29 21 911) or by counting out the refill processes needed during the phase of wetting the laundry (German Published, Non-Prosecuted Application DE 34 46 288). Besides the increased effort and expense to achieve accurate determination of the amount of water or laundry, that determination is again possible only once during the handling cycle.

Since the differentiated determination of the amount of laundry can be of great significance for the selection and form of the next handling cycle to be run, there is a need to achieve the most accurate possible determination of the amount of laundry.

2. Summary of the Invention

It is accordingly an object of the invention to provide a method for determining the amount of laundry in a laundry handling machine, which overcomes the hereinafore-mentioned disadvantages of the heretofore-known methods of this general type and which improves the accuracy of such a method, if at all possible at no added engineering effort or expense.

With the foregoing and other objects in view there is provided, in accordance with the invention, in a method for determining an amount of laundry in an at least approximately horizontally supported drum for laundry being driven by a universal drive motor at a washing and drying rpm, on the basis of observations of parameters of an operation in a laundry handling machine, the improvement which comprises determining a drive moment at the drum drive motor during a drum startup phase, for operating the drum at a controlled handling rpm at which the laundry is not held against a wall of the drum by centrifugal force.

The drum drive moment is a direct image of the load moment generated by the loaded laundry drum, which is caused directly after the drum drive motor is turned on, because of a brief load peak resulting from high mass inertia, and as the process continues it is caused by the rising of the load of laundry from the lowest point of the drum, possibly under the influence of driver protrusions inside the drum. Different sizes of laundry loads naturally cause various magnitudes of load moment, which must be overcome by variously high drive moments.

Therefore, the drive moment is directly dependent on the mass of laundry to be moved in the drum. Through the use of suitable calculation methods, a microcomputer can determine therefrom the value of the laundry mass with sufficient accuracy. Engineering effort need not be employed further for this, since the drive moment can be calculated from the electrical data of the motor control, including the constants of the motor itself.

In accordance with another mode of the invention, given phase lead control for the drive motor, during the drum startup phase, a phase lead angle is recorded continuously and its geometrical mean value is formed, which is a gauge for a mean output of the drive motor, from which a mass of the load of laundry is calculated through a mass inertia and the load moment of the load of laundry. With the typical use of microprocessors, computer capacity is also already available for other control tasks and need merely be installed by suitable programming. The mean value formation is highly suitable as a basis for calculating the mass of the load of laundry.

In accordance with a further mode of the invention, in a washing machine equipped with a device for ascertaining the amount of water in the wash water holder, information about the amount of water located in the wash water holder is an excellent correction value for calculating the mass.

In accordance with an added mode of the invention, values about possible rpm deviations from the command value for the rpm rise are recorded and taken into account by calculating the mass. This is especially advantageous because pieces of laundry tumbling in the drum even in the startup phase occasionally can drop onto a driver protrusion which is just then entering the path by which the laundry drops and as a result can generate an additional load moment.

In accordance with an additional mode of the invention, a profile of rpm deviations is evaluated (periodically, singularly, flatly, abruptly, etc.), and depending on the evaluation, the profile is associated with a memorized attribute about the nature of the load of laundry (large, average, small, absorbent, not so absorbent items of laundry, etc.), then other characteristics of the load of laundry resting in the drum can be detected and used to configure the just-started handling cycle.

In accordance with yet another mode of the invention, a device for determining the magnitude of an operating voltage of the drive motor is a variable which is taken into account as a correction value in calculating the mass. This makes it possible to preclude inaccuracies that would arise from mains voltage fluctuations, regardless of the nature of the measurement method.

In accordance with yet a further mode of the invention, in a drum-type clothes dryer, in the beginning and in the course of the drying cycle, the drive moment at the drum drive is determined multiple times and used to calculate the mass of the particular load of laundry, and differences between successive findings from calculations are used as a gauge for determining the residual moisture of the load of laundry just at that moment.

In accordance with yet an added mode of the invention, as a result, a drying process can be controlled in some way or other as a function of the residual moisture value and finally when the desired goal is reached it can be discontinued.

In accordance with a concomitant mode of the invention, in order to further increase the accuracy of determining the mass of laundry, during an rpm holding phase following the drum startup phase, the mean phase lead angle of the rpm control device of the drum drive motor can be ascertained and serves as a gauge for machine-dictated braking moments to be taken into account in the mass determination by means of the phase lead angle of the startup phase. Such braking moments can be caused by laundry friction, by flexing work of the drum drive belt, by bearing friction, and by other machine-dictated causes.

Other features which are considered as characteristic for the invention are set forth in the appended claims.

Although the invention is illustrated and described herein as embodied in a method for determining the amount of laundry in a laundry handling machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
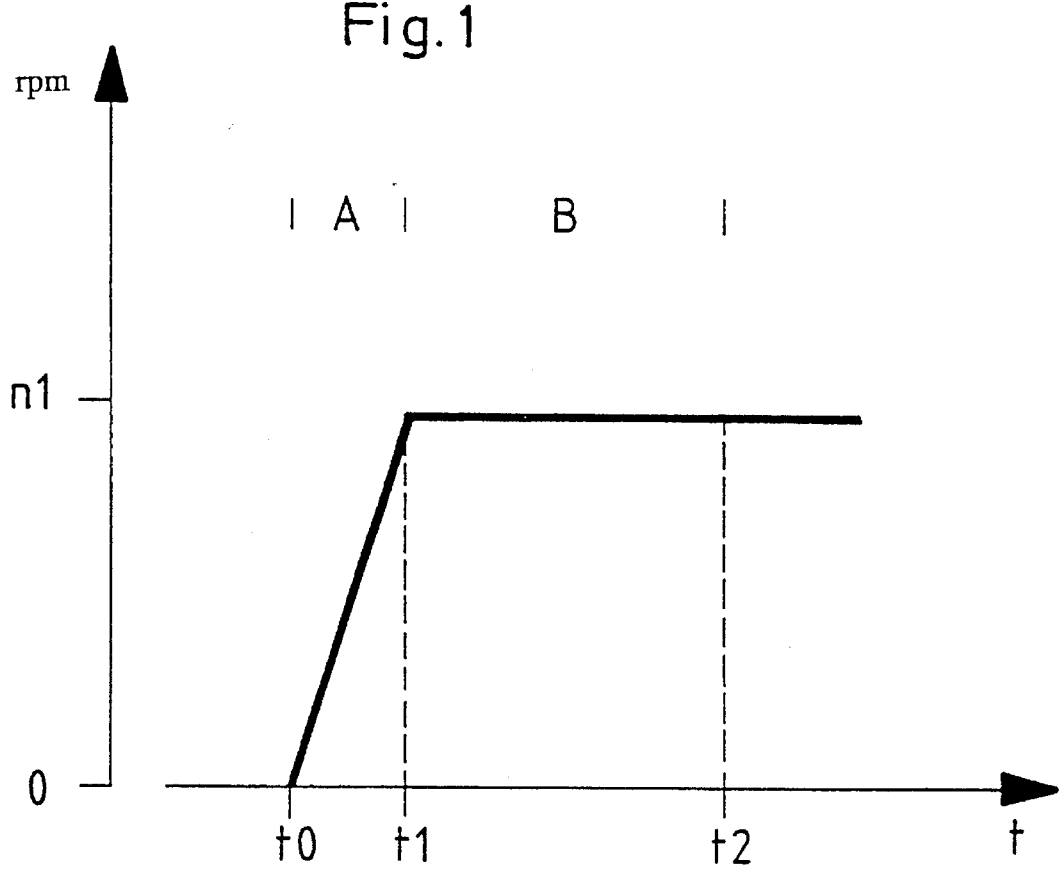
FIG. 1 is a diagram plotting rpm over time for the duration of a drum startup phase and an ensuing rpm holding phase.

Referring now to the figures of the drawing in detail and first, particularly, to FIG. 1 thereof, it is seen that a method according to the invention is employed between times t0 and t1 in the course of a drum startup phase A, during which the rpm of the drum is increased from a standstill up to a handling rpm n1. This handling rpm, for a drum-type washing machine of typical construction, is approximately 55 rpm and is typically utilized to move the laundry during the washing process. In an ensuing rpm holding phase B, correction values can be ascertained that result from machine-dictated brake moments at the drum. This rpm holding phase is limited by time markers t1 and t2.

Figure 2:
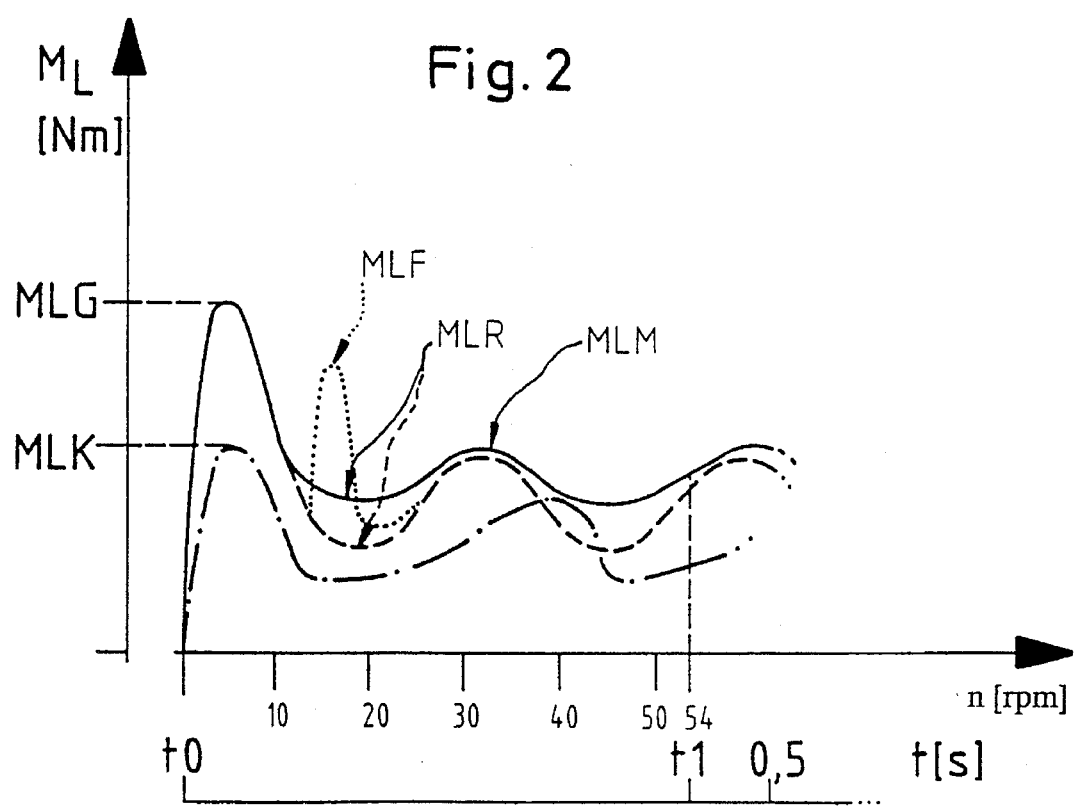
FIG. 2 is a diagram of load moments plotted over a rising rpm or over time for the duration of a startup phase.
Figure 3:
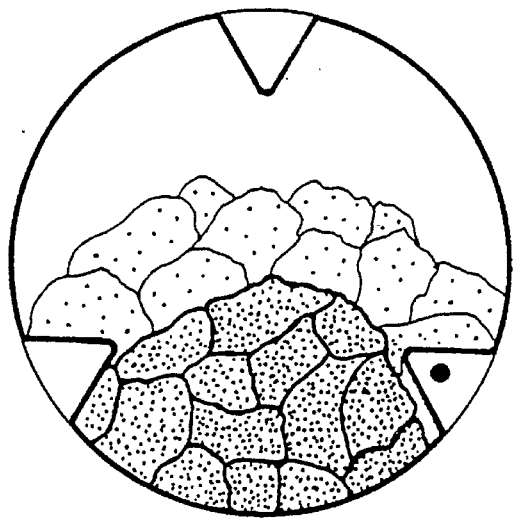
FIGS. 3–5 are diagrammatic, sectional views of three different drum positions during the startup phase.
Figure 4:
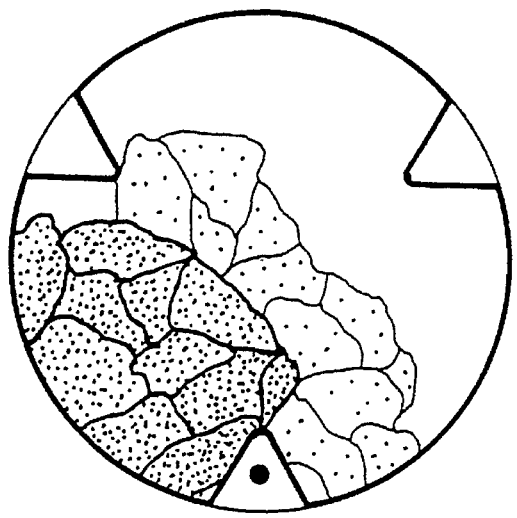
Figure 5:
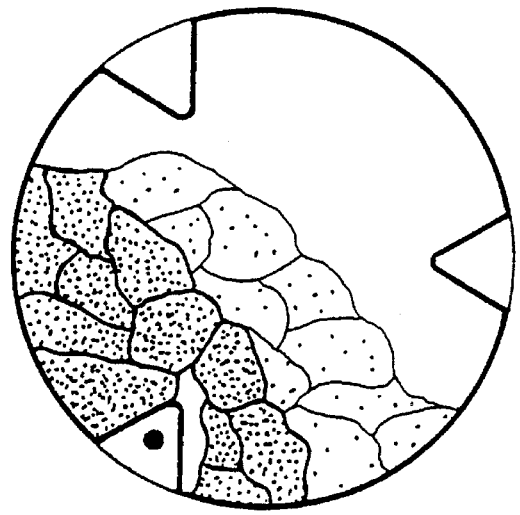

The diagram in FIG. 2 shows various courses of load moments $M_L$ of the drum loaded with laundry, in the course of the increase in drum rpm from 0 up to 54 rpm, for instance during the drum startup phase A. The load moment courses will be explained in conjunction with the drum positions during the startup phase A shown in FIGS. 3–5. Two different sizes of laundry loads are shown in FIGS. 3–5. A small laundry load includes items represented by a heavily dotted pattern. A large laundry load includes all of the items marked by the heavily dotted pattern plus those above it marked with a lightly dotted pattern.

First, the course of the load moment over the rising rpm values will be explained in terms of the smaller laundry load. FIG. 3 shows the drum position with a small laundry load made up of small items with the drum at a standstill. The course of the load moment $M_L$ of this small laundry load is represented by a dot-dashed line in the diagram. In FIG. 4, the drum has been rotated onward by 60° as can be seen from a driver protrusion marked with a dot, and by a further 30° in FIG. 5.

The phase of motion between the positions in FIG. 3 and FIG. 4 includes a high load moment peak MLK shortly before a drive motor is turned on. This characterizes the high inertial moment of the drum with the laundry that must first be overcome by the drive. After that, the load moment rapidly drops again to a value defined by the continuous acceleration of the drum. In the mean time, however, the driver protrusion with the dot moves onward and gradually lifts the laundry load represented by the heavily dotted pattern gradually upward. This is expressed by a slow rise in the load moment as indicated by the dot-dashed line in the diagram of FIG. 2, beyond approximately 15 rpm.

At approximately 40 l/min, the driver protrusion with the dot has reached approximately the position of FIG. 5, in which some items of laundry located above the driver protrusion lose their weight advantage and drop back to the lowermost position in the drum across the driver protrusion. This is expressed by the arching upper curve course in the dot-dashed diagram line in FIG. 2, at approximately 40 rpm. As the driver protrusion continues to rotate, all of the items of laundry finally drop and are virtually back in the same position inside the drum as in FIG. 3. As a result, the load moment drops back again to virtually the minimum value. In the mean time, the rated rpm of 54 rpm, for instance, has virtually been reached. The drum startup phase A is thus ended (at the time t1). If the drive motor is powerful, barely 0.5 seconds have elapsed by then.

A larger load of laundry also causes greater load moments. The more lightly dotted items of laundry shown in FIGS. 3–5 change the small load having the heavily dotted pieces of laundry, into an overall large load of laundry. The moment of inertia is correspondingly greater when the drive motor is turned on, so that the solid line in the diagram of FIG. 2 first deflects to a value MLG before the drum, with its heavy load of laundry, is set into notable rotation. Then, however, the torque drops down to a value MLR and the position of the driver protrusion with the dot is once again between the positions shown in FIGS. 3 and 4. From there on, the driver protrusion with the dot lifts the load of laundry and thus increases the load moment of the drum. Consequently, the solid line in the diagram rises again up to a value MLM, which is reached before a notable amount of items of laundry drops back across the ridge of the driver protrusion to the bottom of the drum.

A small load of laundry is made up of a generally more compact amount of laundry, which is kept compact for a very long time and raised far by the trailing driver protrusion before individual items of laundry separate from it and drop down. This is the reason why the maximum load moment is greater in comparison to the minimum than with a large laundry load, and also why it is reached later. Since items of laundry in a large laundry load already separate, whereas a smaller laundry load in the same position is still being kept together in compact fashion, the total mass to be lifted is less. The load moment curve of a large load of laundry therefore has a flatter course. Moreover, the breaking up of the load of laundry that has already been initiated decreases the total mass to be raised to such an extent that the load moment ML is already beginning to drop again in drum positions in which the load moment of a smaller laundry load is still rising. The load moment of a large load of laundry made up of small items of laundry therefore reaches its maximum MLM sooner than that of the small load of laundry.

The difference between the minimum MLR and the maximum MLM is approximately of the same magnitude for a large load of laundry as for the small load of laundry with small items, as is represented by the dashed line in the diagram of FIG. 2, if the small items in the large load of laundry are in the same proportion to the size of the load of laundry as in the small load of laundry. However, if the large load of laundry has only large items, then the difference between the minimum load moment MLR and the maximum load moment MLM is less, as is represented by the solid line in FIG. 3.

Moreover, small items that separate prematurely from the clump of the load of laundry, as is expressed by the dotted line in FIG. 2, cause additional small load moment deflections MLF, when they drop onto a following driver protrusion after detaching. When they simply roll over the clump of laundry down to the bottom (wall) of a wash water holder, such items have almost no effect. However, when they strike a driver protrusion, the dissipation of their kinetic energy does cause an additional load moment.

The course of the load moments established in succession within the time or rpm increments can be recorded for the duration of the startup phase and analyzed. The size of the load of laundry and its composition can then be detected fairly reliably from the comparison with reference values for each that are stored in memory. If in addition such drum startup phases are carried out at different times at the beginning of the washing process, then the absorbency of the load of laundry can also be ascertained and thus the type of laundry can be determined. In order to do so, a drum startup phase must already be taking place before the laundry is wetted with fresh water. Upon comparison with a later drum startup phase with moistened laundry, the amount of water retained in the load of laundry can be determined directly.

The application of the determination method according to the invention in a clothes dryer, makes it possible to first determine the wet weight of the load of laundry and as the drying process continues, this kind of laundry quantity determination can be repeatedly carried out to track the decrease in residual moisture in the laundry. Depending on the course of the decrease in mass, certain process parameters can be controlled, and finally, when a target value is reached for the residual moisture, the drying process can be ended.

The application of the method of the invention for load detection requires no additional components, if the drum drives are equipped with a universal motor. A statement as to the absorption capability of the load of laundry in the washing machine is also possible by making use of a previously conventional method of load detection, namely by concluding the mass of the load of laundry from observing the inflowing quantity of water. The load detection according to the invention is virtually independent of tolerances of such machine components as a water level transducer, a quantity controller, a utility line pressure, and so forth. The load detection according to the invention can be repeated at any moment in the handling process. This is possible even if the washing machine or dryer has been turned off in the course of the cycle, and even if the load of laundry has been changed in the mean time, for instance by the addition or premature removal of individual items.

We claim:

1. In a method for determining an amount of laundry in a laundry handling machine, wherein the laundry is disposed in an at least approximately horizontally supported drum, and the drum is driven by a universal drive motor, and the amount of laundry is determined on the basis of observations of parameters of an operation in the laundry handling machine, the improvement which comprises:

ascertaining a drive moment at the drum drive motor during a drum startup phase during which the drum is accelerated to a controlled treatment rpm at which the laundry is not held against a wall of the drum by centrifugal force; and determining the amount of laundry in the drum from the drive moment ascertained in the ascertaining step.

2. The method according to claim 1, which comprises continuously recording a phase lead angle of a phase lead control for the drive motor during the drum startup phase, and forming a geometrical mean value of the phase lead angle being a gauge for a mean output of the drive motor, from which a mass of the load of laundry is calculated through a mass inertia and a load moment of the load of laundry.

3. The method according to claim 2, wherein the laundry handling machine is a washing machine with a wash water holder, and the method further comprises ascertaining a quantity of water in the wash water holder of the washing machine, and taking information about the quantity of water located in the wash water holder into account as a correction value in calculating the mass of the load of laundry.

4. The method according to claim 1, which comprises recording values about possible rpm deviations from a command value for an rpm rise, and taking the values into account in calculating a mass of the load of laundry.

5. The method according to claim 4, which comprises evaluating a profile of rpm deviations, and depending on the evaluation, associating the profile with a stored attribute about the nature of the load of laundry.

6. The method according to claim 4, which comprises determining the drive moment of the drum drive multiple times at a beginning and during a course of a drying cycle in a drum-type clothes dryer, calculating a mass of a particular load of laundry by using the drive moment, and determining a residual moisture of the load of laundry just at that moment by using differences between successive findings from calculations as a gauge.

7. The method according to claim 6, which comprises ending the drying cycle by using the determined residual moisture value as a criterion.

8. The method according to claim 1, which comprises determining a magnitude of an operating voltage of the drive motor, and taking the magnitude of the operating voltage into account as a correction value in calculating a mass of the load of laundry.

9. The method according to claim 1, which comprises ascertaining a mean phase lead angle of an rpm control device of the drum drive motor during an rpm holding phase following the drum startup phase, and using the mean phase lead angle as a gauge for machine-dictated braking moments to be taken into account in the mass determination by means of the phase lead angle of the startup phase.

\* \* \* \* \*